Dec. 4, 1956 J. B. CHATTEN 2,773,116

LUMINANCE CORRECTION APPARATUS FOR COLOR TELEVISION SYSTEMS

Filed Aug. 20, 1953 3 Sheets-Sheet 1

INVENTOR.
JOHN B. CHATTEN

BY

ATTORNEY

INVENTOR.
JOHN B. CHATTEN
BY
Oren V. Hazeltine
ATTORNEY

INVENTOR.
JOHN B. CHATTEN

BY

ATTORNEY

United States Patent Office 2,773,116

Patented Dec. 4, 1956

2,773,116

LUMINANCE CORRECTION APPARATUS FOR COLOR TELEVISION SYSTEMS

John B. Chatten, Philadelphia, Pa., assignor to Philco Corporation, Philadelphia, Pa., a corporation of Pennsylvania Application August 20, 1953, Serial No. 375,505

9 Claims. (Cl. 178—5.2)

This invention relates to color television systems, and particularly to a method and apparatus for improving the fidelity of image reproduction in the vicinity of abrupt transitions in the color image.

Certain classes of color television systems have been proposed in which the brightness of the reproduced image is controlled primarily by a relatively wide band signal commonly designated the luminance signal, while the chromaticity of the image is controlled primarily by a relatively narrow band signal commonly designated the chrominance signal. In a system of this class, amplitude predistortion, or "gamma-correction," of the transmitted signals has generally been found necessary in order to compensate for the amplitude distortion which is otherwise introduced by the non-linear amplitude characteristic of the image display device, commonly a cathode-ray tube. With the type of gamma-correction usually employed, the nature of the signals generated at the transmitter is normally such that, while the signals applied to the chrominance channel have substantially no effect upon the luminance of the reproduced image when reproducing colors near white, nevertheless, for increasingly more saturated colors, greater and greater percentages of the luminance intelligence are conveyed by the chrominance channel until, for colors near the system primaries, the chrominance channel may actually assume the dominant role in conveying the luminance intelligence.

With such a system, the reproduced image has generally been found to exhibit a substantial degree of apparent blurring or lack of definition in the vicinity of abrupt image transitions on at least one side of which a color of substantial saturation is present. For convenience, such a transition will hereinafter be referred to as a "color transition," where this term is understood to refer to all horizontal transitions in the image except purely achromatic transitions, and includes transitions on either or both sides of which the image possesses an appreciable degree of color saturation. Inspection of such a transition will usually reveal that luminance perturbations are present in the form of undesired lightening or darkening preceding and following the desired sharp transition. This lack of fidelity in luminance representation is particularly undesirable in systems of the class presently under consideration, since such systems rely for their efficient utilization of spectrum space upon the representation of luminance variations with preferentially high fidelity, as compared to chrominance variations, in this way taking advantage of the superior acuity of the human eye for changes in luminance as compared to changes in chrominance.

Accordingly, it is an object of my invention to provide color television apparatus for reproducing a color image with improved apparent definition, without increasing the spectrum bandwidth required for signal transmission.

Another object is to provide a color television transmitter for generating transmissions which, when received by a conventional color television receiver, will produce a color image in which abrupt transitions involving at least one color of substantial saturation may be reproduced with improved luminance definition, without requiring an increase in the bandwidth of the transmissions.

Still another object is to provide a color television transmitter in which a correction signal is generated and combined with the normal luminance signal, to counteract the above-described luminance perturbations in the vicinity of abrupt color transitions in the reproduced image.

My invention involves as one component thereof the recognition that the source of the above-described spurious brightness variations in prior art systems, lies in the failure of the relatively narrow band chrominance channel to pass high frequency components of the luminance intelligence existing in the original camera signal, which are generated and applied to the chrominance channel during the scanning of abrupt color transitions. Since a substantial part of the signal energy required to effect reproduction of such a color transition is contained in the signals assigned to the chrominance channel, the deletion of the high-frequency components of the chrominance signal by the band-limiting means normally employed in the chrominance channel of the transmitter removes a substantial amount of the high-frequency signal required to reproduce accurately the transition. The luminance of the color transition is therefore controlled partly by the wide-band luminance signal, and partly by the chrominance signal from which high-frequency intelligence has been removed. Abrupt transitions in the luminance at color transitions are therefore reproduced inaccurately. Furthermore, even if the transition involves only chrominance changes, with no accompanying luminance changes, luminance errors will in general still be introduced at the transition because of the change in the distribution of luminance-determining signal energy between the chrominance and luminance channels. The net result in either case is to introduce perturbations in the luminance of the reproduced image in the vicinity of such color transitions, and therefore deleteriously to affect the fidelity of image reproduction.

In accordance with my invention, I generate at the transmitter a new form of luminance signal which is so composed as to compensate for and to overcome at least in part the above-described luminance perturbations in the reproduced image.

In one preferred embodiment, this is accomplished by generating and adding to the normal luminance signal, a correction signal sufficient to counteract the effects of the above-described luminance perturbations. Preferably, such a correction signal is obtained by providing electrical apparatus at the transmitter which simulates the operations of an ideal receiver including a non-linear display device, and which produces an output signal varying in accordance with the luminance variations which would be produced by the display device of such an ideal receiver when supplied with the transmissions of the prior art. Also generated is a true-luminance signal, the variations in which represent the manner in which the luminance of the display in an ideal receiver would vary in the absence of the above-described luminance perturbations. Subtraction of the simulator signal from the true-luminance signal then produces a difference signal indicative of the undesired luminance perturbations, but in opposite phase thereto. This difference signal is then weighted by the normal luminance signal so as to provide a correction signal whose effect upon display luminance, after combination with the normal luminance signal, is substantially proportional to variations in the above-described difference signal. As will be explained more fully hereinafter, the weighting operation may be accomplished by dividing the difference signal by the normal luminance signal. Appropriate gain controls may also be included to permit adjustment of the correction signal to the amplitude required for exact compensation of luminance perturbations, or to provide any desired degree of partial or over-compensation.

In a second preferred embodiment of the invention, to be described hereinafter in detail, the frequency components of the normal luminance signal and of the chrominance signal having frequencies above the lowest frequency of the chrominance signal which is inherently suppressed, are intentionally suppressed and replaced by a new group of high-frequency components which are added to the frequency-restricted normal luminance signal to control more accurately the luminance variations in the image.

Although the above-described methods of generating the final transmission are preferred for certain purposes, other methods of forming the desired signal are also possible, some of which will be described hereinafter in detail. As an example, especially suited at the present time for low-fidelity, closed-loop color television systems such as are useful in certain industrial applications, an electrical servosystem circuit may be used to control automatically the form of the transmitted luminance signal so as to eliminate any differences between the output signal of a receiver-simulating circuit and a true-luminance signal. In still another form, substantial improvements in the luminance reproduction in standard, high-fidelity color television systems may be obtained by deriving pulse signals indicative of rapid changes in a preselected color component of the original image, and adding these pulse signals to the normal luminance signal in such phase, magnitude and polarity as to minimize the more objectionable types of luminance perturbations from the reproduced image. Although this latter method is less effective in producing accurate reproduction of all types of color transitions, its simplicity makes it highly attractive as a means of reducing the more severe and noticeable types of luminance perturbations.

Other objects and features of the invention will be more fully appreciated from a consideration of the following detailed description in connection with the accompanying drawings, in which.

Figure 1:
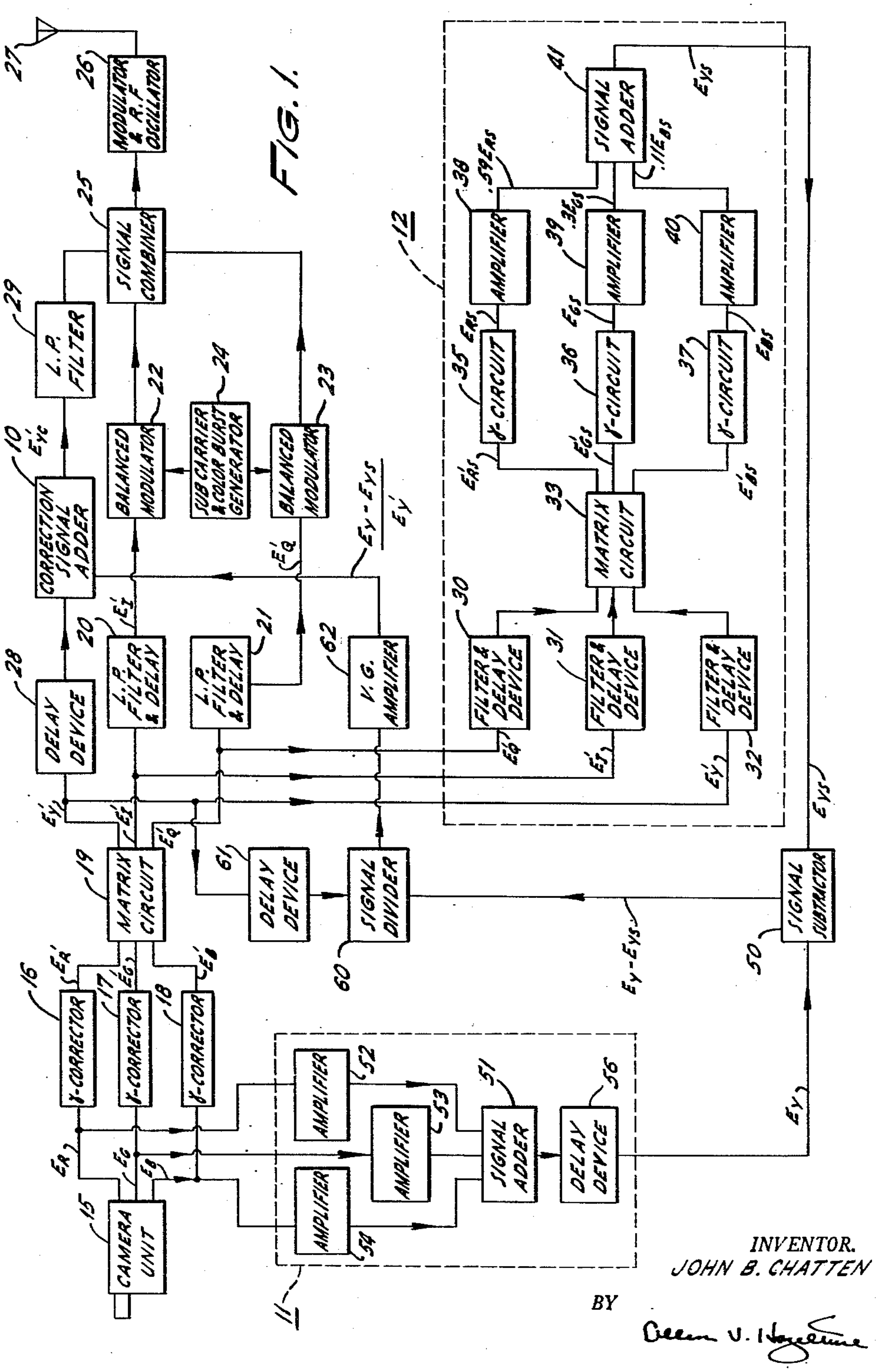
Figure 1 is a block diagram of a transmitter embodying the invention in one preferred form.

Referring to Figure 1, the embodiment there shown comprises, generally, known means for generating a conventional gamma-corrected chrominance signal primarily representative of the I and Q values of an original color image, and a conventional gamma-corrected normal luminance signal primarily representative of luminance variations in that image, together with means in accordance with the invention for adding to the normal luminance signal a correction signal for counteracting the luminance perturbations described hereinbefore, which may occur in the reproduced image at the receiver when utilizing the transmissions of the prior art. The desired correction is obtained in this instance by employing a correction signal adder 10, inserted in the luminance channel at the transmitter and supplied with a correction signal which is equal to the appropriately-weighted difference between a true-luminance signal from generator 11 and the output signal of a receiver-simulating circuit 12, the latter device producing an output signal indicative of the variations which would occur in the luminance of the reproduced image of an ideal receiver when supplied with signals of the prior art. In this instance, proper weighting of the correction signal is accomplished through division thereof by the normal luminance signal.

Since each of the elements of Figure 1 may be constructed in accordance with practices well known in the color television art, it will not be necessary to describe in detail the exact nature of each of them, and accordingly only a general characterization thereof will be set forth. For a detailed description of principles applicable to the design of circuits of this class, reference may be had to an article by J. F. Fisher, appearing at page 338 of the "Proceedings of the I. R. E." for March 1953.

Describing first that part of the combination of elements which is employed in color television systems of the prior art, a conventional camera unit 15 may be utilized in known manner to scan the image to be reproduced and to generate a signal $E_R$ varying in proportion to variations in the red component of the original image, a separate signal $E_G$ varying proportionally to variations in the green component of the image, and another separate signal $E_B$ varying proportionally to variations in the blue component thereof. It is understood that the camera scanning is controlled by appropriate synchronizing signals, and that similar synchronizing signals are also transmitted to the receiver along with the image-representing signals, by means of conventional apparatus which, in the interest of clarity of exposition, is not shown or further described.

The signals $E_R$, $E_G$ and $E_B$ are applied to gamma-correctors 16, 17 and 18 respectively, wherein, by conventional means, each signal may be amplitude-predistorted in a controlled manner to compensate for amplitude non-linearities in the remainder of the system, particularly in the image-display device utilized at the receiver. This predistortion will ordinarily be such that the output signals $E_R'$, $E_G'$ and $E_B'$ of the gamma-correctors are root functions of the corresponding input signals $E_R$, $E_G$ and $E_B$, an exponent value of 1/2.75 being typical. A form of gamma-corrector suitable for this purpose is described in detail in the copending application Serial No. 324,784 of R. C. Moore & G. L. Carson, filed December 8, 1952, and entitled "Electrical System."

The output signals $E_R'$, $E_G'$ and $E_B'$ of gamma-correctors 16, 17 and 18 respectively, may then be supplied to a matrix circuit 19 for generating a normal luminance signal $E_Y'$, as well as a pair of signals representative of the I and Q values of the image and designated $E_I'$ and $E_Q'$ respectively. In a preferred embodiment, the normal luminance signal $E_Y'$ is substantially equal to $$.30\,E_R'+.59\,E_G'+.11\,E_B'$$

The $E_I'$ and $E_Q'$ signals are preferably substantially equal to $.74\,(E_R'-E_Y')-.27\,(E_B'-E_Y')$, and $$.48\,(E_R'-E_Y')+.41\,(E_B'-E_Y'),$$

respectively. It will be understood, however, that the invention is in no way limited to systems utilizing this specific set of color-representing parameters, and that other signals such as $(E_R'-E_Y')$ and $(E_G'-E_Y')$, for example, may be used instead to supplement the $E_Y'$ normal luminance signal or even some other brightness-representing signal. Matrix circuits suitable for forming such signals, and which are characterized by providing output signals each of which is composed of predetermined fractions of the several input signals thereto, are well known in the art, and therefore, will not be described further here or later in connection with other matrix circuits employed in other portions of the systems described hereinafter.

The signals $E_I'$ and $E_Q'$ may then be operated upon and transmitted as in prior art color television transmission. For example, the signal $E_I'$ may be passed through a low pass filter and delay circuit 20 having a pass band of substantially 1.2 megacycles per second, while the signal $E_Q'$ may be passed through another low pass filter and delay circuit 21 having a pass band of substantially 0.6 megacycles per second (hereinafter abbreviated "mc."). The band-limited $E_I'$ and $E_Q'$ signals may then be applied to balanced modulators 22 and 23, respectively, to produce amplitude modulation of differently-phased subcarrier signal components having the same nominal frequency of approximately 3.58 mc. Preferably, the sub-carrier frequency is an odd integral multiple of one-half the horizontal line-scanning rate.

To permit this subcarrier modulation and to provide a phase reference signal for subsequent utilization in the receiver, subcarrier and color-burst generator 24 may generate bursts of subcarrier oscillations during conventional horizontal blanking intervals, these oscillations having a reference phase which will be arbitrarily designated as —180°, and may provide balanced modulator 22 with continuous subcarrier oscillations having a phase angle of 123°, while providing balanced modulator 23 with oscillations having a phase angle of 33°. Appropriate circuit arrangements for generating the necessary subcarrier signals and for accomplishing the desired amplitude modulation thereof being well known in the art, it will be unnecessary to describe them further in detail here, except to point out that the arrangement is preferably such that, when representing a reference white such as standard Illuminant C, and when the modulating signals $E_I'$ and $E_Q'$ are therefore substantially zero, then the amplitudes of the subcarrier components from the balanced modulators are also substantially zero. Circuit arrangements of this general type are described more fully in copending application Serial No. 236,585 of D. B. Smith, filed July 13, 1950, and in the above-cited article of Fisher.

The output signals of the balanced modulators 22 and 23 are then combined additively by means of signal combiner 25 to form the chrominance signal, which is then passed through modulator and *r—f* oscillator 26 to transmitting antenna 27 for transmission to the receiver. It is understood that the *r—f* oscillator may include an appropriate vestigial sideband filter for limiting the complete transmission to the allotted frequency bandwidth—4.2 mc. in the preferred embodiment.

The $E_Y'$ signal from matrix circuit 19 is supplied by way of delay device 28 to correction signal adder 10 which, as mentioned hereinbefore and as will be described in detail hereinafter, is also supplied with the correction signal for overcoming the luminance perturbations produced at the receiver by prior art transmission. From signal adder 10, the corrected $E_Y'$ signal, hereinafter designated $E_{YC}'$, is supplied to low pass filter 29, which preferably has a pass band of substantially 3 mc. From the latter filter, the $E_{YC}'$ signal is passed through combiner 25 and modulator and *r—f* oscillator 26 to antenna 27, whence it is radiated along with the previously-described chrominance signal.

Delay device 28, and the filter and delay circuits 20 and 21 are adjusted, in conjunction with other delay devices in the system and hereinafter described, so as to compensate for the unequal delays of the various paths by which video intelligence from the camera unit 15 is conveyed to antenna 27.

In accordance with this embodiment of the invention, the apparatus for producing an output signal proportional to the luminance variations of an ideal receiver supplied with signals of the prior art, comprises the receiver simulator 12, which includes a first filter and delay device 30 supplied with the $E_Q'$ signal from matrix circuit 19, a second filter and delay device 31 supplied with the $E_I'$ signal from matrix circuit 19, and a third filter and delay device 32 supplied with the normal luminance signal $E_Y'$, also from matrix circuit 19.

The filter and delay devices 30, 31 and 32 preferably have passbands of 0–0.6 mc., 0–1.2 mc. and 0–12 mc., respectively, with substantially linear phase response throughout each band. Such low-pass filters may readily be designed in accordance with well known filter theory, for example as set forth in Chapters VIII and X of "Electric Circuits and Wave Filters" by A. T. Starr, published in 1938 by the Pitman Publishing Co., New York. Also included in the filter and delay devices are means for providing amounts of delay such as to produce proper relative phasing of the several signal components when supplied to matrix circuit 33, and, in conjunction with other delay devices in the system, to produce phase equalization for all signals supplied to antenna 27. Such delays may be provided by inserting proper lengths of transmission cable in series with each signal path, a suitable cable for this purpose being RG/65–U having a characteristic impedance of 1,000 ohms and providing a delay of about 0.05 microseconds per linear foot.

Matrix circuit 33 is functionally the inverse of matrix circuit 19 in that it is responsive to the $E_Y'$, $E_I'$ and $E_Q'$ signals supplied thereto, to produce at its output terminals three separate, primary-color representing signals $E_{RS}'$, $E_{GS}'$, $E_{BS}'$, where the additional subscript "S" designates signals derived in the simulator circuits. This step is directly analogous to the operation which would normally take place in an ideal receiver in converting the received transmissions into voltages suitable for application to red, green and blue light-producing devices, and the apparatus employed may be substantially the same. For example, the signal $E_{RS}'$ may be derived from the common plate load of three parallel-connected triode vacuum tubes, the separate grids of which are supplied with the $E_Y'$, $E_I'$ and $E_Q'$ signals in proportions indicated by the coefficients of the following expression:

$$E_{RS}'=1.0E_Y'+.63E_Q'+.92E_I'$$

Similar apparatus may be used to provide the $E_{GS}'$ and $E_{BS}'$ signals, the coefficients of which are given by the following expressions:

$$E_{GS}'=1.0E_Y'-.686E_Q'-.283E_I'$$

and $$E_{BS}'=1.0E_Y'+1.8E_Q'-1.17E_I'$$

The relative gains indicated by the above coefficients may conveniently be obtained by means of simple voltage-dividers, the negative signs of certain of the coefficients representing a reversal of polarity of the corresponding signal such as may be obtained by means of a suitable phase-reversing amplifying stage.

The $E_{RS}'$, $E_{GS}'$ and $E_{BS}'$ signals are then passed through gamma-circuits 35, 36 and 37 and amplifiers 38, 39 and 40 respectively, to signal adder 41. The gamma-circuits 35, 36 and 37 are functionally the inverse of the gamma-correctors 16, 17 and 18, and operate to remove the amplitude predistortion inserted by the gamma correctors and to produce the color signals $E_{RS}$, $E_{GS}$, and $E_{BS}$, which are substantially identical in form to the variations in intensity of red, green and blue light which an ideal receiver would produce. These gamma-circuits may therefore be considered as simulating the amplitude response of a conventional cathode-ray tube for example. Such gamma-circuits are well known in the art and easy to construct, and may for example comprise an ordinary pentode vacuum tube characterized by an exponential relationship between plate current and grid voltage, where the value of the exponent is substantially equal to gamma. For example, one may employ for this purpose a type 6SJ7 pentode operated so that the blanking level of the applied signal corresponds approximately to the cutoff voltage of the pentode and signal variations drive the grid voltage about six volts positive from cutoff, the screen voltage being adjusted to provide the desired form of plate current-grid voltage characteristic.

The function of amplifiers 38, 39 and 40 and signal adder 41 is to provide a single output signal $E_{YS}$ from the receiver-simulator 12 which varies in accordance with variations in the luminance of the image which would be produced by an ideal receiver when supplied with the prior art transmissions. Accordingly, the amplifiers 38, 39 and 40 may be adjusted to supply signal adder 41 with the $E_{RS}$, $E_{GS}$ and $E_{BS}$ signals in substantially the proportions 0.30:0.59:0.11. These latter ratios express the relative efficacy of equal amounts of the red, green and blue colors in producing brightness effects in the human eye. The sum of these proportions of the three color signals therefore represents the luminance variations which would be produced by the above-mentioned ideal receiver. Suitably, the amplifiers 38, 39, 40 may be triode vacuum stages, the signal proportions 0.30:0.59:0.11 being provided by appropriate voltage dividers serially disposed in the three separate signal paths. The adder 41 may for example comprise three parallel-connected triodes, the grid of each triode being supplied with a different one of the signals to be added and the sum signal appearing across the common plate load resistor of the three tubes.

The signal $E_{YS}$ from the receiver-simulator 12 is supplied to one input terminal of a conventional signal subtractor 50, the other input terminal of which is supplied with a true-luminance signal $E_Y$ from the true-luminance signal generator 11. The generator 11 may suitably comprise a signal adder 51, supplied with the signals $E_R$, $E_G$ and $E_B$ from camera unit 15 by way of amplifiers 52, 53 and 54 respectively, which amplifiers are preferably adjusted so as to supply signal adder 51 with amounts of the signals $E_R$, $E_G$ and $E_B$ which are substantially in the ratios 0.30:0.59:0.11. The amplifiers 52, 53 and 54 may therefore be generally similar to amplifiers 38, 39 and 40 in the receiver-simulator 12.

The output signal from signal adder 51 then comprises the true-luminance signal $E_Y$, which is substantially equal to $0.30E_R+0.59E_G+0.11E_B$, and varies substantially exactly in accordance with variations in the luminance of the original image. Preferably the true luminance signal $E_Y$ is then passed through a delay device 56 to the above-mentioned second input terminal of subtractor 50, the delay device being provided as a convenience in adjusting the relative time delays of the several signals to be combined at subtractor 50, and at antenna 27.

Subtractor 50 is therefore supplied with the luminance-simulating signal $E_{YS}$ from the receiver-simulator 12, which varies in accordance with the variations in luminance which would exist at the display device of an ideal receiver supplied with transmissions of the prior art, including the undesired luminance perturbations described hereinbefore, and is also supplied with a true-luminance signal $E_Y$ which represents by its variations the manner in which the luminance of the receiver display would vary if the undesired luminance perturbations were absent. Subtractor 50 then operates to produce an output signal $(E_Y-E_{YS})$ which varies in proportion to the undesired luminance perturbations produced in prior art color television systems, but which is in opposite phase thereto. A suitable subtractor for this purpose may comprise a pair of parallel-connected triode vacuum tubes having a common plate load, the grid of one triode being supplied with the signal $E_{YS}$ and the grid of the other triode being supplied with the $E_Y$ signal after phase reversal in an appropriate amplifier stage.

The perturbation-representing difference signal $$(E_Y-E_{YS})$$

is then applied to one input terminal of signal divider 60, the second input terminal of which is supplied by way of delay device 61, with the normal-luminance signal $E_Y'$ so that the output signal of the divider has a form which may be represented as $$\frac{E_Y-E_{YS}}{E_Y'}$$

Dividing circuits suitable for performing this operation are also well known in the art. One suitable form of divider may comprise a phase splitter for separating the $E_Y-E_{YS}$ signal into two signals of opposite polarities, each of the separate signals then being supplied to the grids of different triode amplifiers at relatively low levels. The $E_Y'$ signal may then be supplied to the grids of the same triodes in a direction and at a level such as to reduce the gains of the triodes markedly in response to increases in the $E_Y'$ signal. The two output signals of these two triodes may then be supplied to a conventional differential amplifier wherein the similarly-phased $E_Y'$ components cancel each other while the oppositely-phased $$\frac{E_Y-E_{YS}}{E_Y'}$$

signals combine additively at the output terminals.

The purpose of this division by $E_Y'$ is to weight the difference signal $(E_Y-E_{YS})$ in accordance with differences in the signal sensitivity of the light-producing display device at the receiver. If the display device were such as to produce luminance variations linearly related to variations in the luminance signal, the difference signal $(E_Y-E_{YS})$ could be added directly to the normal luminance signal to counteract the undesired luminance perturbations in the reproduced image. However, the change in luminance produced at the display device in response to a small unit change in luminance signal, hereinafter designated the "luminance sensitivity" of the display device, is not a constant but is a function of the total luminance of the device. In the case of a display device using a red-light producing cathode-ray tube, a green-light producing cathode-ray tube and a blue-light producing cathode-ray tube supplied with signals $E_R'$, $E_B'$ and $E_G'$, respectively, to form the final reproduced image, the luminance of these tubes will be $0.30\ E_R'$ $0.59\ E_G'^{\gamma}$ and $0.11\ E_B'^{\gamma}$ respectively. The luminance sensitivities of these tubes are then the derivatives of luminance with respect to signal voltage for each, or $0.30\gamma E_R'$, $0.59\gamma E_G'$ and $0.11\gamma E_B'$, respectively, when $\gamma$ is approximately 2. The luminance sensitivity of the entire display device is proportional to the sum of the luminance sensitivities of the individual tubes, and is therefore substantially equal to $$K(0.30E_R'+0.59E_G'+0.11E_B')$$

which in turn equals $KE_Y'$, where K is a constant. Thus, the luminance sensitivity of the complete display device is substantially proportional to the magnitude of the luminance signal. Therefore, to form a correction signal which will vary the luminance of the reproduced image in proportion to the difference signal $(E_Y-E_{YS})$, the difference signal is properly weighted in inverse proportion to the luminance sensitivity of the receiver display device through division by $E_Y'$.

The weighted correction signal from divider 60 is then supplied to correction signal adder 10 by way of variable gain amplifier 62 for combination with the normal luminance signal $E_Y'$ to form the corrected luminance signal $E_{YC}'$. From the foregoing, it will be apparent that the correction signal is of such form and polarity as to counteract the luminance perturbations which would be produced in a typical receiver if only the normal luminance signal were transmitted. By appropriate adjustment of the gain of amplifier 62, any desired degree of correction for these perturbations may be obtained. Suitably the desired gain control may be provided by a single voltage-divider circuit, and correction signal adder 10 may take the form of a pair of triodes having a common plate load across which the output signal $E_{YC}'$ is developed in response to the $E_Y'$ signal which is supplied to the grid of one triode and the $$\frac{E_Y-E_{YS}}{E_Y}$$

signal which is supplied to the grid of the other triode.

It is emphasized that the embodiment of Figure 1 is of especially broad applicability in that the uncorrected luminance signal, as well as the chrominance signal, may take any of a large variety of forms, since the luminance corrector will automatically add to the luminance signal the proper correction signal for effecting accurate luminance reproduction at the receiver.

Figure 2:
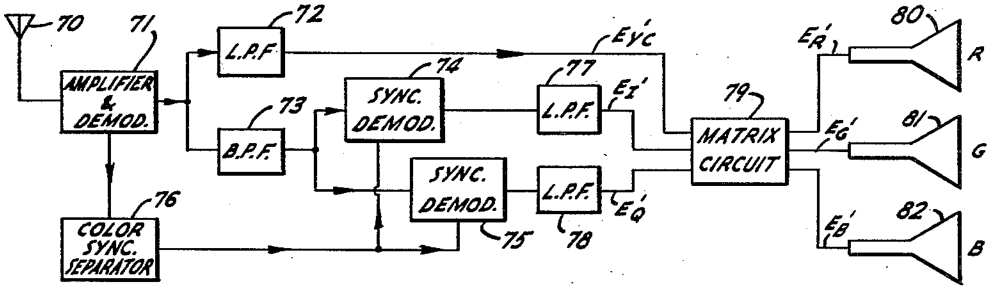
Figure 2 is a block diagram of the basic elements of a color television receiver adapted to receive the transmissions of the transmitter of Figure 1.

An understanding of the invention and its mode of operation will be facilitated by a brief consideration of Figure 2, which represents the general form of a typical color television receiver for use in connection with the transmitter just described. It will be understood that the detailed circuitry and auxiliary apparatus required in an actual receiver are not shown, since they are well known in the art and are not necessary for the purpose of the present explanation.

In Figure 2, antenna 70 is adapted to intercept the transmissions from transmitting antenna 27 in Figure 1, and to supply them to amplifier and demodulator 71. The latter element functions to produce at its output terminals a signal substantially identical with that applied to the modulator and *r—f* oscillator 26 in the transmitter, containing the luminance signal in the frequency range 0–3 mc., and the modulated subcarrier signal representative of chrominance in the frequency range 2.4–4.2 mc. This demodulated signal is then separated into two portions by means of low-pass filter 72 and bandpass filter 73, the passband of filter 72 corresponding to the luminance transmission band of 0–3 mc., while the passband of filter 73 corresponds to the subcarrier signal band of 2.4–4.2 mc.

The signal from filter 73 may then be supplied to the synchronous demodulators 74 and 75, from which are recovered the signal $E_I'$ and $E_Q'$ respectively. To control the synchronous demodulation, the synchronous demodulators may be supplied with appropriate color synchronizing signals, derived in known manner from the received signal by way of color sync separator 76. After demodulation, the signal $E_I'$ and $E_Q'$ may be passed through low pass filters 77 and 78 of bandwidths 1.2 mc. and 0.6 mc., respectively.

The separated luminance signal, as well as the band-limited $E_I'$ and $E_Q'$ signals, may then be supplied to a matrix circuit 79, wherein there may be derived the individual gamma-corrected color signal $E_R'$, $E_G'$ and $E_B'$, which are then utilized to control the intensities of light from the red cathode-ray tube 80, the green cathode-ray tube 81 and the blue cathode-ray tube 82, respectively. The light from these three tubes is combined by any suitable means (not shown), to provide the final multicolored image.

Figure 3:
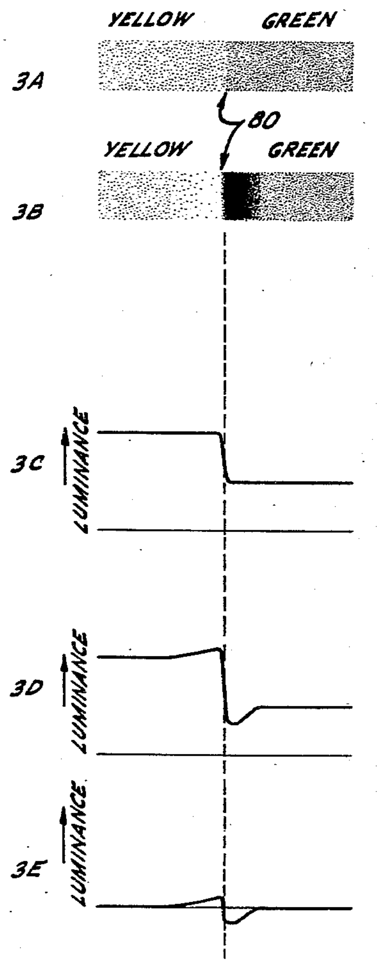
Figures 3 and 4 are diagrammatic representations useful in explaining the principles of operation of the invention.

When a receiver of the general type shown in Figure 2 is supplied with the transmissions of the prior art, the output of the low pass filter 72 thereof comprises the normal luminance signal, hereinbefore designated $E_Y'$, without the additional correction signal component which is provided in accordance with the present invention. Figure 3 indicates generally the nature of the image reproduction obtained with such prior art transmissions.

In Figure 3A, there is represented the qualitative appearance of a portion of the original image which contains an abrupt transition from a yellow color to a green color of equal intensity. In this instance, the yellow region is to the left of the transition 80, the green region to the right, and normal scanning by the television beam is assumed to be from left to right across the transition.

Figure 3B illustrates the reproduction of the luminance of such a color transition by a color television system of the prior art. While reproduction in regions relatively remote from the transition region 80 is sufficiently accurate in this case, the luminance of the reproduced image in the vicinity of the transition departs from that of the original in the undue lightening which precedes, and darkening which follows, the desired transition.

In the graphical representations of Figures 3C, 3D and 3E, the vertical dimension in each case represents luminance, while the horizontal dimension indicates lateral position in the screen regions shown in Figures 3A and 3B. Figure 3C illustrates graphically the luminance variation which would be required at the receiver to reproduce accurately the transition of Figure 3A, while Figure 3D illustrates that actually produced by a prior art color television system and resulting in the transition of Figure 3B. The graph of Figure 3E then represents the luminance perturbations existing in such a prior art system, being derived by subtraction of the ordinates of Fig. 3C from those of Fig. 3D. The positively-directed luminance perturbation represents the undue lightening preceding the transition, and the negatively-directed perturbation represents the undue darkening following it.

Operation in accordance with the invention then involves the modification of prior art color television transmissions to include therein a component operative to counteract the perturbations shown in Figure 3E. In the embodiment of Figure 1, this is accomplished by deriving at the transmitter a true-luminance signal $E_Y$ whose variations with time are substantially the same as the ideal luminance variations shown in Fig. 3C, by also deriving a signal $E_{YS}$ whose variations are substantially the same as the luminance variations which would be produced by a conventional system, as shown in Fig. 3D, by subtracting the signal $E_{YS}$ from the signal $E_Y$ to produce a difference signal equal and opposite to the luminance perturbations represented in Fig. 3E, and by combining this difference signal with a conventional transmission in such manner as to counteract the above-mentioned perturbations at the receiver.

Although the exact form of the correction signal depends upon the nature of the particular color transition to be represented, typically its waveform comprises a group of positive and/or negative pips occurring in the immediate vicinity of the transition. These pips are made up of high frequency components, generated in the above-described manner to replace signal components representative of high frequency variations in luminance which are deleted from the chrominance signal by the conventional transmitter apparatus. The invention in this aspect will be more readily understood from a consideration of Figure 4.

In the graphs of Figures 4A, 4B, 4C and 4D, ordinates represent signal amplitudes and abscissae represent frequency to the scale indicated. In Figure 4A, there are shown three typical frequency components of the luminance variations in a gray image: a first component $C_1$ in the range (0–0.6) mc., a second component $C_2$ in the range (0.6–1.2) mc., and a third component $C_3$ in the range (1.2–3) mc. Since the image is without chroma, these frequency components are represented in their entirety by the normal luminance signal, are transmitted to the receiver without substantial discrimination among them, and contribute to the accurate reproduction of gray variations with 3 mc. definition.

Figure 4:
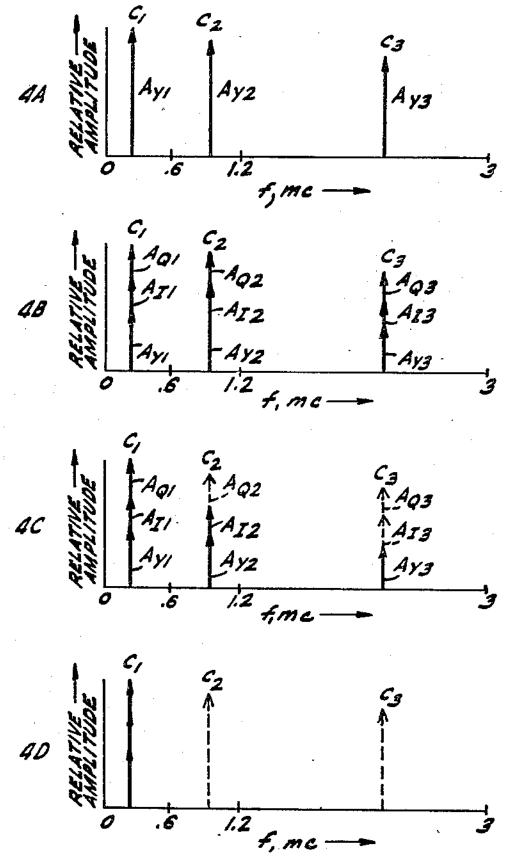

It will be understood that there will in general be many more frequency components of the luminance variations of the image, the three shown in Figure 4 having been selected as illustrative in that $C_1$ lies in the frequency band passed by each of the I, Q and luminance channels, $C_2$ is in a band passed by only the I and the luminance channels, and $C_3$ occupies a band passed by the luminance channel alone. Furthermore, the exact amplitudes of the components shown are chosen only for convenience in illustration and do not correspond to those produced by the transition 80 in Figure 3, particularly in that the transition of Figure 3 involves a change in chroma and hence a change in distribution of luminance intelligence among the several transmission channels, not shown in Figure 4.

In Figure 4B, there are shown the amplitudes of the same frequency components $C_1$, $C_2$ and $C_3$, but in this instance they are components of luminance variations in chromatic portions of the image, and hence only the parts of their amplitudes $A_{Y1}$, $A_{Y2}$ and $A_{Y3}$ respectively, are represented by an amplitude component of the normal luminance signal. Ignoring for the present the bandwidth limitations of the I and Q channels, the additional parts $A_{I1}$, $A_{I2}$ and $A_{I3}$ of the luminance components $C_1$, $C_2$ and $C_3$ are represented by an amplitude component of the I signal, and the remaining parts $A_{Q1}$, $A_{Q2}$ and $A_{Q3}$ are represented by the Q signal. However, since the I signal channel is limited to the transmission of modulation components of approximately 1.2 mc. or less, by filter 20 of Figure 1 for example, while the Q channel is limited to the transmission of modulation components of approximately 0.6 mc. or less, as by filter 21, the signals representing $A_{Q2}$, $A_{Q3}$ and $A_{I3}$ are not passed by the conventional system, as is shown in Figure 4C.

In Figure 4C, the solid arrows indicate those parts of the amplitude of the frequency components $C_1$, $C_2$, $C_3$ which are represented by the transmissions of a conventional color television system and which operate to effect reproduction of image luminance in the vicinity of color transitions, while the dotted arrows indicate those parts for which representation is not provided in such conventional systems. From this figure, it will be apparent that the principal deficiency of the prior art system lies in its inability to represent properly the higher frequency components of luminance variations occurring at color transitions, particularly those having frequencies greater than 0.6 mc. In this aspect, it is the function of the embodiment of the invention shown in Figure 1 to derive signals representative of luminance components such as those shown in dotted form in Figure 4C, and to add them to the normal luminance signal in such manner as to control the luminance of the reproduced image as though all luminance-representing components had been transmitted with the full three mc. bandwith. When this correction is accomplished in such a way as to cause the luminance variations of the reproduced image to correspond to those of the original image with as great accuracy as is possible in a 3 mc. bandwidth, then the luminance signal may be said to be perfectly corrected.

Figure 5:
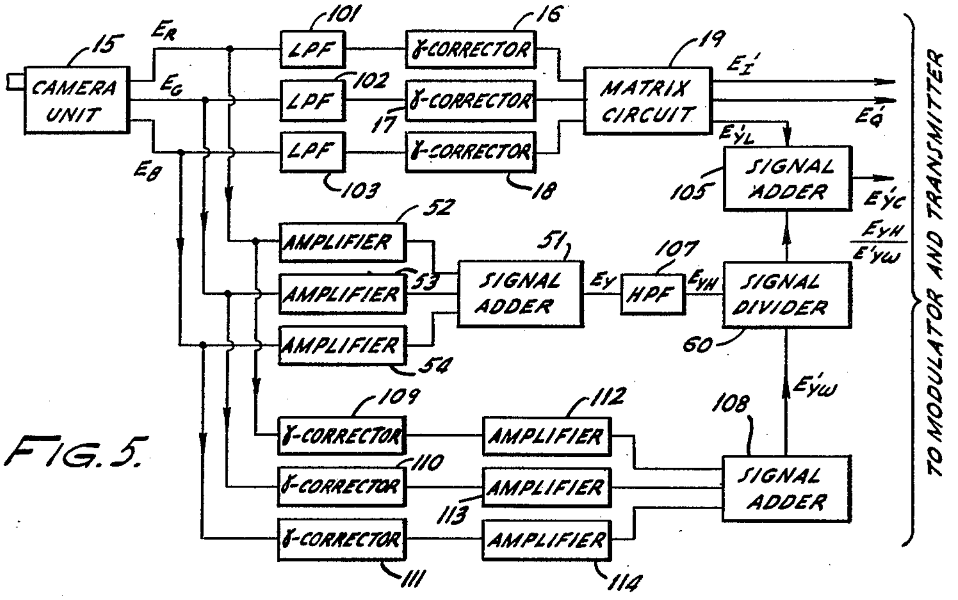
Figure 5 is a block diagram of a color television transmitter embodying my invention in another form.

Figure 4D is illustrative of the manner in which the above-described deficiencies of prior art systems are overcome in an embodiment of the invention shown in Figure 5 and presently to be described. In this instance, all components of the normal luminance signal and of the I and Q signals which lie above 0.6 mc., such as those representative of $C_2$ and $C_3$, are intentionally deleted and replaced by corresponding signals of proper amplitude to represent components such as $C_2$ and $C_3$ in their entireties.

The manner in which the latter type of operation may be realized will be appreciated from a consideration of Figure 5, wherein parts corresponding to those in Figure 1 are indicated by like numerals. In this figure, camera unit 15 may again produce the color-representing signals $E_R$, $E_G$, $E_B$, which are then passed through low pass filters 101, 102 and 103, and gamma-correctors 16, 17 and 18, respectively, to matrix circuit 19. These low pass filters are characterized by passbands extending from 0 to $f_L$, where $f_L$ may be 0.6 mc. in a typical embodiment. Matrix circuit 19 is operative to produce at its output terminals the separate signals $E_I'$, $E_Q'$ and $E_{YL}'$, where the designation $E_{YL}'$ indicates that this signal differs from the normal luminance signal in that it is restricted to the low frequency band $0-f_L$. The signals $E_I'$ and $E_Q'$ may then be supplied to a conventional modulator and transmitter as in the embodiment of Figure 1, while the low frequency luminance signal $E_{YL}'$ is first passed through a signal adder 105 and then is applied to the same conventional modulating and transmitting arrangement.

The portion of the system of Figure 5 thus far described therefore provides accurate intelligence as to image variations corresponding to frequencies less than $f_L$, and thus provides accurate luminance representation in this frequency region.

To provide the required luminance representation for the higher frequency components between 0.6 and 3 mc., appropriately-weighted high frequency components of a true luminance signal are generated and added to the low frequency luminance signal described above. To accomplish this, the color-representing signals $E_R$, $E_G$, and $E_B$ from camera unit 15 may each be supplied to signal adder 51 by way of amplifiers 52, 53 and 54 respectively, the output signal of signal adder 51 then comprising a true luminance signal $E_Y$ which is substantially equal to $.30E_R+.59E_G+.11E_B$. The signal $E_Y$ is then passed through a high pass filter 107, having a passband which may extend from substantially 0.6 to 3 mc., the resulting higher frequency true-luminance signal being designated $E_{YH}$.

Before the higher frequency true-luminance signal $E_{YH}$ is combined with the low frequency normal luminance signal $E_{YL}'$ in signal adder 105, it is desirable, as in the case of the correction signal in the embodiment of Figure 1, to weight this added signal so as to accommodate the nonlinear amplitude characteristic of the image-reproducing device of the receiver. An appropriate weighting signal may be derived by supplying the color-representing signals $E_R$, $E_G$ and $E_B$ to signal adder 108 by way of gamma-correctors 109, 110 and 111, and amplifiers 112, 113, 114, respectively. These gamma-correctors may be similar to gamma-correctors 16, 17 and 18, while amplifiers 112, 113 and 114 may be substantially identical with amplifiers 52, 53 and 54 respectively.

The output of signal adder 108, designated $E_{YW}'$, then comprises a wide band normal-luminance signal which is applied to signal divider 60 for weighting of the $E_{YH}$ signal. The output of signal divider 60 therefore comprises a signal having a form which may be represented by the quotient $E_{YH}/E_{YW}'$. For higher values of luminance for which the luminance sensitivity of the image-reproducing device is normally greater, the higher frequency components supplied to signal adder 105 are therefore reduced in amplitude correspondingly so as to produce the desired brightness variations, as has been explained hereinbefore in detail in connection with the weighting of the difference signal derived in the embodiment of Figure 1.

As has already been noted, the diagram of Figure 4D is illustrative of the principle of operation of the embodiment of Figure 5. The low pass filters 101, 102 and 103 serve to eliminate from the signals $E_I'$, $E_Q'$ and $E_{YL}'$ all frequency components above 0.6 mc. The necessary higher-frequency components in a range 0.6 to 3 mc. are generated in signal adder 51 and selected by high pass filter 107 for weighting by the wide band luminance signal $E_{YW}'$ and subsequent combination with the low-frequency normal luminance signal $E_{YL}'$. All frequency components of the luminance variations are therefore completely represented, and accurate luminance reproduction in the vicinity of abrupt color transitions is obtained.

Figure 6:
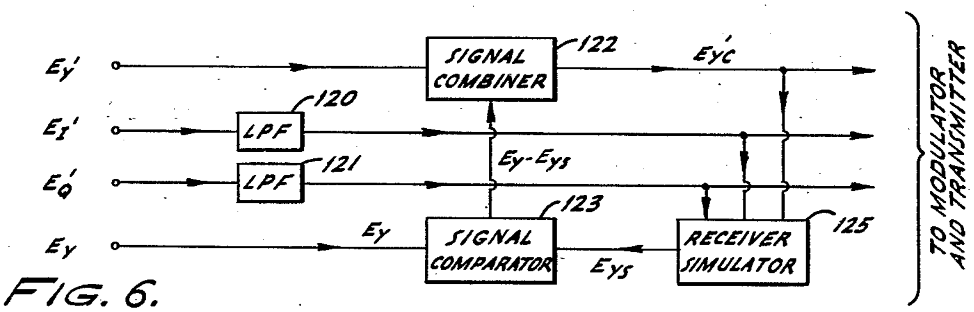
Figure 6 is a block diagram illustrating still another form which my invention may take in certain special applications.

Other widely different arrangements for providing similar operation, and other forms of the several elements of the system, may also be employed without departing from the spirit of the invention. One such alternative arrangement is shown as to its essential elements in Figure 6. In this embodiment, the $E_I'$ and $E_Q'$ signals are again supplied to the above-described modulator and transmitter by way of low pass filters 120 and 121, which may suitably have passbands of 1.2 mc. and 0.6 mc. respectively, while the normal luminance signal is first supplied to a signal combiner 122 before application to the modulator transmitter. The signal combiner 122 may comprise either an additive or multiplicative combiner, and is also supplied with signals from the signal comparator 123. Signal combiner 122 is responsive to these signals from signal comparator 123 to modify substantially instantaneously the normal luminance signal $E_Y'$ in such a direction as to produce a corrected luminance signal $E_{YC}'$ of the appropriate form for producing accurate luminance reproduction at the receiver.

To accomplish this, an electrical signal is again derived which is indicative of the variations in image luminance which would be produced in a typical receiver of the prior art. To accomplish this, a receiver-simulator 125 is employed which may be similar to element 12 of Figure 1, but which might in some instances comprise other apparatus such as a television monitor for producing light variations corresponding to those produced by a conventional receiver, together with a suitable optical system for converting these light variations into a luminance-representing electrical signal, for example.

In any event, the signal from receiver-simulator 125 is applied to one input terminal of signal comparator 123, the other input terminal of which is supplied with a true-luminance signal $E_Y$ which may be generated in the manner indicated hereinbefore in connection with Figure 1. The output of signal comparator 123 will then comprise the difference between the two signals applied thereto, and therefore is indicative of discrepancies between the luminance of the original image and the luminance of the image reproduced by a typical receiver. These output signals are applied to signal combiner 122 in such phase as to produce modifications of the luminance signal in directions which tend to eliminate such discrepancies. The system as a whole then operates as a servosystem, to control the luminance signal in such manner as to produce the desired luminance reproduction at the receiver.

Because of practical limitations as to the speed with which such servosystems may produce accurate correction, this embodiment of the invention is at present of principal practicability for use in relatively low-definition systems such as may be useful in closed-loop, industrial color-television for example.

Figure 7:
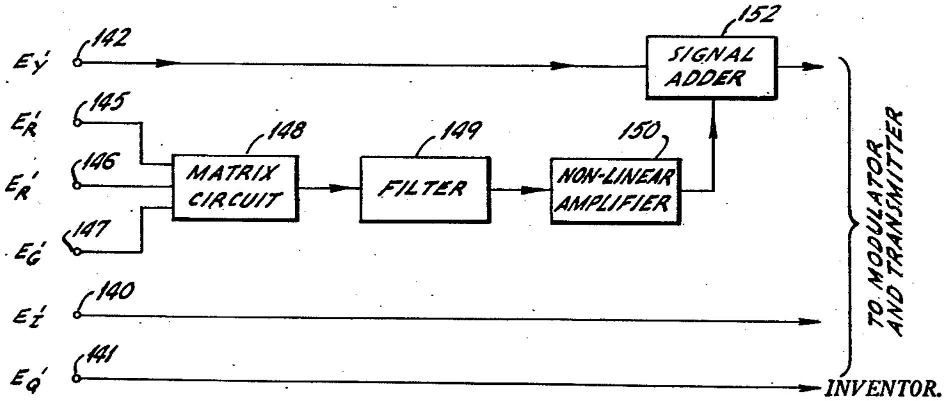
Figure 7 is a diagram, partly schematic and partly in block form, of a greatly simplified form of the invention, useful in producing at least partial luminance correction.

In Figure 7, on the other hand, there is illustrated a form of the invention which is applicable to conventional, high-quality color television transmission and which is extremely simple in form, but which is not adapted to produce as accurate luminance correction for all types of color transitions as are the embodiments of Figures 1 and 5 for example. In Figure 7, the conventional signals $E_I'$ and $E_Q'$, applied to input terminals 140 and 141 respectively, are supplied directly to the modulator and transmitter exactly as in a conventional system. However, the normal luminance signal $E_Y'$ applied to input terminal 142 is modified in the following manner to produce more accurate representation of rapid luminance variations of prescribed types.

Input terminals 145, 146 and 147 are supplied with the gamma-corrected red, green and blue-representing signals $E_R'$, $E_B'$ and $E_G'$, which signals are combined in predetermined proportions by means of matrix circuit 148. The proportions in which the signals $E_R'$, $E_B'$ and $E_G'$ are combined will generally be determined by the color with respect to variations in which the above-described perturbations are most objectionable in the particular application, but may be selected arbitrarily at the will of the operator. For example, if in a particular application it is found that luminance perturbations are most objectionable at transitions from red to black, then the matrix circuit 148 may suitably combine the signals $E_R'$, $E_B'$ and $E_G'$ with a greater proportion of $E_R'$ than would be selected to produce a normal luminance signal. The output signal of matrix circuit 148 will then be accentuated when representing changes in colors possessing a large red component.

The output signal from matrix circuit 148 is then applied to high-pass filter 149, which produces substantial output signals only upon the occurrence of input signal variations having frequencies above the upper limit of the chromaticity signal band, 1.2 mc. for example.

Since filter 149 does not pass direct currents, the output signal thereof is oscillatory in nature, and is amplified by non-linear amplifier 150, which may be arranged by conventional means to amplify one half-cycle of the oscillatory signal more than the other. In particular, amplifier 150 may be arranged to remove one half-cycle of the oscillation produced by filter 149 upon the traversal of sudden transitions of the above-mentioned preselected types, leaving only a single pulse for combination with the normal luminance signal in adder 152. In the case exemplified, this pulse will be of greatest magnitude upon the occurrence of abrupt transitions in image colors having a preponderance of red therein.

In the operation of Figure 7, the matrix circuit 148 generates a signal indicative of variations in a preselected color parameter of the image, filter 149 selects those higher frequency components corresponding to abrupt transitions in the selected color parameter, which may be suitably shaped and poled by amplifier 150 to provide narrow pips upon the occurrence of such transitions, which are combined with the normal luminance signal by means of adder 152 to counteract preselected types of luminance perturbations in the reproduced image.

Figure 7 therefore represents an extremely simple and practical form of the invention, in which abrupt transitions in a preselected color component of the image are provided with luminance correction.

Although the invention has been described with particular reference to specific embodiments thereof, it will be obvious in view of the foregoing that it is susceptible of embodiment in any of a large variety of differing forms without departing from the spirit thereof.

I claim:

1. In a compatible color transmitter for generating transmissions representative of an original color image: means for deriving a normal luminance signal which represents accurately and substantially completely the total luminance of achromatic portions of said image and which contains an amplitude component representative of a part of the luminance of chromatic portions of said image; means for deriving a chrominance signal containing amplitude components representative of the remaining part of the luminance of said chromatic portions; frequency-discriminatory means for limiting said chrominance signal to a bandwidth substantially less than that of said luminance signal, thereby to introduce deficiencies in the representation of higher-frequency variations in the luminance of said chromatic image portions; means for generating a true-luminance signal representative of the total luminance of said image throughout a frequency band greater than that of said chrominance signal; means responsive to said normal luminance signal and to said chrominance signal to produce an output signal indicative of those luminance variations which will be produced in the reproduced image of an ideal receiver supplied with said normal luminance signal and said chrominance signal; means for comparing said output signal with said true-luminance signal to derive difference signals indicative of discrepancies in the luminance of said reproduced image; and means responsive to said difference signals to generate a correction signal for combination with said normal luminance signal, to counteract said deficiencies in luminance representation.

2. In a system for the electrical representation of color images: means for generating a first signal substantially exactly representative of a predetermined root function of variations occurring at less than a rate $f_H$ in the luminance of achromatic portions of said images, and substantially less precisely representative of the same root function of variations occurring at less than said rate $f_H$ in chromatic portions of said image; means for generating a second signal representative of said predetermined root function of variations in a predetermined first primary value of said images occurring at less than a rate $f_{L1}$, said second signal containing an amplitude component representative of a part of the remaining intelligence as to the luminance of said chromatic image portions; means for generating a third signal representative of said predetermined root function of variations occurring at less than a rate $f_{L2}$ in a second primary value of said images; means for generating a fourth signal accurately representative of variations in the luminance of chromatic portions of said images; means responsive to said first, said second and said third signal for producing a fifth signal substantially proportional to the total luminance intelligence contained in said first, second and third signal; means for comparing said fourth and said fifth signals to produce a sixth signal indicative of differences between said fourth and fifth signals; means for weighting said sixth signal to deemphasize amplitude variations occurring therein when said first signal assumes relatively higher values; and means for combining said sixth signal with said first signal to supplement the luminance intelligence contained therein.

3. In a system for the electrical translation of an original color image from a transmitter to a receiver; means for generating a first and a second signal, together operative to control accurately the reproduction in said receiver of image variations occurring at less than a frequency $f_L$; means for substantially eliminating from said first and second signals, frequency components thereof lying above said frequency $f_L$; means for generating a third signal representative of those variations in the luminance of said original image occurring at a rate in excess of said frequency $f_L$; and means for transmitting said first, second and third signals to said receiver.

4. The system of claim 3, in which said means for generating said third signal comprises a high-pass filter for limiting said third signal to frequencies in excess of substantially said frequency $f_L$, said system also comprising means for producing a fourth signal substantially representative of the luminance of said original image up to a frequency in excess of said frequency $f_L$, and a signal-dividing circuit responsive to said third signal and to said fourth signal for weighting said third signal in inverse proportion to said fourth signal.

5. In a color television system including means for generating a first signal primarily representative of the luminance of an original image and a second signal primarily representative of color components other than said luminance, said first and second signals being suitable for transmission to a receiver to effect approximate reproduction of said image, said reproduced image being characterized by spurious perturbations in the luminance thereof, apparatus for reducing the objectionable effects of said perturbations, said apparatus comprising an electrical circuit supplied with said first and second signals for deriving color-representing signals varying substantially in proportion to those which would be derived therefrom in an ideal receiver to control the generation of light of the colors of the system primaries, means for altering said color-representing signals in accordance with the amplitude characteristics of the image-displaying devices of said receiver to produce modified signals indicative of the intensities of the primary colors of light in said receiver, and means for combining said modified color-representing signals in proportions substantially equal to the respective relative luminosities of said primary colors to provide a third signal indicative of the luminance of the image produced by said first and second signals in said receiver, means for generating a fourth signal accurately representative of the luminance of said original image, and means responsive to said third and fourth signals for modifying said first signal in accordance with differences between said third and fourth signals.

6. In a color television system which includes a camera system for successively scanning portions of the image to be reproduced by said system: means for producing a first signal which varies as a first function of variations in the luminance of said successively scanned portions; means for producing a second signal which varies in response to variations in the chrominance of said successively scanned portions; means for limiting variations in said second signal to a narrower frequency range than variations in said first signal; means for producing a correction signal which varies as a second function, different from said first function, of variations in the luminance of said successively scanned image portions; and means for utilizing said correction signal to modify those frequency components of said first signal which lie outside said narrower frequency range.

7. In a color television system which includes a camera system for successively scanning portions of the image to be reproduced by said system: means for producing a first signal which varies as a first function of variations in the luminance of said successively scanned portions; means for producing a second signal which varies in response to variations in the chrominance of said successively scanned portions; means for limiting variations in said second signal to a narrower frequency range than variations in said first signal; means for producing a correction signal which varies as a second function, different from said first function, of variations in the luminance of said successively scanned image portions; and means for utilizing at least those frequency components of said correction signal which lie outside said narrower frequency range to modify said first signal.

8. In a color television system which includes a camera system for successively scanning portions of the image to be reproduced by said system and an image reproducing system for successively reproducing said successively scanned image portions: means for producing a first signal which varies as a first function of variations in the luminance of said successively scanned portions; means for producing a second signal which varies in response to variations in the chrominance of said successively scanned portions; means for limiting variations in said second signal to a narrower frequency range than variations in said first signal; means for deriving from said first signal and said second frequency limited signal a third signal which varies in a manner indicative of variations in the luminance of said successively reproduced image portions; means for producing a fourth signal which varies as a second function, different from said first function, of variations in the luminance of said successively scanned image portions; means for utilizing said third and fourth signals to produce a correction signal indicative of discrepancies between them; and means for utilizing said correction signal to modify those frequency components of said first signal which lie outside said narrower frequency range so as to reduce said discrepancies.

9. In a color television system which includes a camera system for successively scanning portions of the image to be reproduced by said system and an image reproducing system for successively reproducing said successively scanned image portions: means for producing a first signal which varies as a power function of variations in the luminance of said successively scanned portions; means for producing a second signal which varies in response to variations in the chrominance of said successively scanned portions; means for limiting variations in said second signal to a narrower frequency range than variations in said first signal; means for deriving from said first signal and said second frequency limited signal a third signal which varies in a manner indicative of variations in the luminance of said successively reproduced image portions; means for producing a fourth signal which varies as a linear function of variations in the luminance of said successively scanned image portions; means for utilizing said third and fourth signals to produce a correction signal indicative of discrepancies between them; and means for utilizing said correction signal to modify those frequency components of said first signal which lie outside said narrower frequency range so as to reduce said discrepancies.

References Cited in the file of this patent

UNITED STATES PATENTS

| | | |
|---|---|---|
| 2,492,926 | Valensi | Dec. 27, 1949 |
| 2,635,140 | Dome | Apr. 4, 1953 |
| 2,653,182 | Sleeper | Sept. 22, 1953 |
| 2,657,257 | Lesti | Oct. 27, 1953 |
| 2,664,462 | Bedford | Dec. 29, 1953 |
| 2,683,770 | Kalfaian | Aug. 13, 1954 |
| 2,690,471 | France | Sept. 28, 1954 |